Nov. 30, 1965  R. W. PAULEY  3,220,525

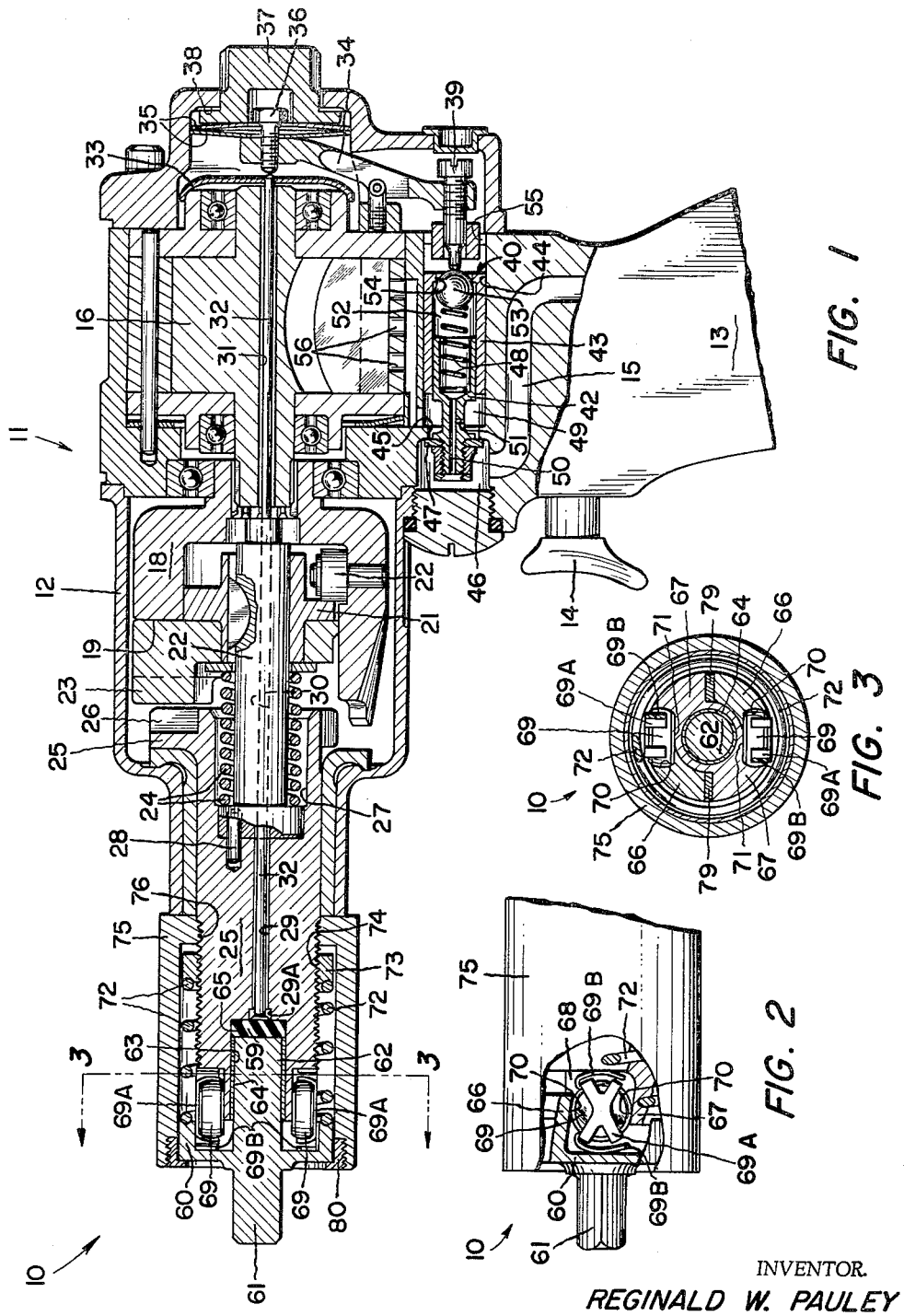

TORQUE CONTROL MECHANISM FOR POWER TOOL

Filed March 18, 1964  3 Sheets-Sheet 2

INVENTOR.
REGINALD W. PAULEY
BY
/ATTORNEY

Nov. 30, 1965   R. W. PAULEY   3,220,525
TORQUE CONTROL MECHANISM FOR POWER TOOL
Filed March 18, 1964   3 Sheets-Sheet 3

INVENTOR.
REGINALD W. PAULEY
BY
ATTORNEY

United States Patent Office 3,220,525
Patented Nov. 30, 1965

3,220,525
TORQUE CONTROL MECHANISM FOR POWER TOOL
Reginald W. Pauley, Bridgewater Township, Somerset County, N.J., assignor to Ingersoll-Rand Company, New York, N.Y., a corporation of New Jersey
Filed Mar. 18, 1964, Ser. No. 352,880
5 Claims. (Cl. 192—150)

This invention relates to torque control mechanisms for power-operated tools and more particularly relates to an improved torque sensing and responsive mechanism operative to effect the cessation of the rotary power from a source thereof to a driven means upon a predetermined torque load imposed on the latter.

The present invention constitutes an improvement over the torque control mechanisms disclosed in copending U.S. patent application Serial No. 246,277, filed December 20, 1962. This copending application discloses a torque control mechanism comprising a torque transmitter connected with a driven member, such as an anvil of an impact clutch, through an interconnecting means, such as a tapered key and keyway arrangement or meshing helical splines, associated with the torque transmitter and the driven member. The interconnecting means provides the transmission of the rotation from the driven member to the torque transmitter and, upon a predetermined torque load upon the torque transmitter, causes the latter to axially move relative to the driven member. A relatively incompressible means which is capable of a relatively substantial flow when subjected to an external force, such as rubber or liquid, is confined in a cavity between the driven member and the torque transmitter so that, upon the axial movement of the torque transmitter, the latter engages and exerts a force on the incompressible means to cause the latter to flow or deform. A relatively small opening is provided to communicate with the cavity, in which opening is disposed a rod or plunger mounted for slidable axial movement upon the flow or deformation of said incompressible means. The size of the pressure surface of the torque transmitter which acts against the incompressible means is substantially larger than the opening into which the incompressible means is caused to flow so that a small linear movement of the torque transmitter against the incompressible means is amplified into a relatively large deflection, flow, or deformation at the opening in the cavity. This amplificatory feature permits very fine increments of torque adjustments.

It has been found that finer and more accurate torque adjustments can be achieved if the frictional forces between the interconnecting means, the torque transmitter, and the driven member can be reduced.

It is, therefore, an object of the present invention to provide a torque transmitting mechanism which is capable of being more accurately adjusted for predetermined torque loads than heretofore-known torque control mechanisms.

Accordingly, the present invention contemplates a torque control mechanism comprising a driven means and an output member or torque transmitter constructed and arranged to provide circumferentially spaced jaws, the respective jaws of the driven means and the torque transmitter being spaced from each other. A rolling means, such as a ball or a roller, is disposed within each of the spaces between the jaws. The complementary surfaces of the jaws contact the rolling means and are inclined to cam the rolling means axially upon a predetermined torque load on the torque transmitter and thereby exert a pressure on the incompressible means, which pressure is directly propportional to the magnitude of the torque load. Since the axial movement of the torque transmitter is achieved through a rolling means, the frictional forces are reduced to a negligible amount and the mechanism responds more precisely to the torque load than in heretofore-known devices.

In one embodiment of the present invention the rolling means is journaled for rotation in the driven member and is disposed to rotate in a contoured slot which is formed in the torque transmitter.

The above and other objectives and advantages of the present invention will appear more fully hereinafter from a consideration of the detailed description which follows when taken together with the accompanying drawings wherein two embodiments of the invention are illustrated and in which:

FIG. 1 is a sectional view of the torque control mechanism according to this invention as applied to an impact power tool;

FIG. 2 is a fragmentary view, in elevation, of the torque control mechanism shown in FIG. 1 with parts broken away for illustrative purposes only;

FIG. 3 is a sectional view taken substantially along lines 3—3 of FIG. 1;

Figure 4:
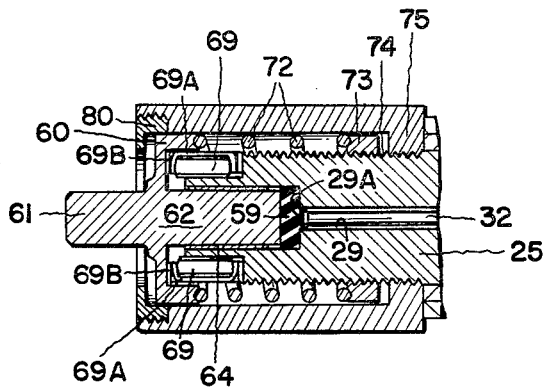
FIG. 4 is a fragmentary view, similar to FIG. 1, showing another operative position of the torque control mechanism.

Now referring to the drawings, particularly to FIGS. 1 to 6, 10 generally designates a torque control mechanism according to this invention shown as applied to a fluid-driven impact tool 11 which is adapted to drive a fastener engaging member (not shown) attached to the torque control mechanism.

The impact tool 11 has a housing 12, a handle 13, and a trigger 14 disposed in the handle for controlling the flow of the fluid under pressure through a passage 15, the source of the fluid under pressure being connected to the bottom of the handle. An air motor 16 is disposed in housing 12 and is spline-connected to a hammer 18. Hammer 18 has longitudinal slots extending inwardly from the outer end of the hammer with the slots terminating at 19. Hammer 18 carries a cam follower or roller 20 which engages a cam 21 keyed to a spindle or shaft 22. Cam 21 has a slot therein in which the key can slide so that cam 21 may move longitudinally relative to the shaft but cannot rotate with respect to the shaft. Hammer jaws 23 are mounted on cam 21 and are slidably disposed in the slots in hammer 18. A coiling spring 24 is mounted on shaft 22 to bear at one end against a washer which, in turn, bears against hammer jaws 23. A driven member, such as an anvil 25, has jaws 26 on one end thereof, which jaws are adapted to rotationally engage hammer jaws 23 and thereby be rotated by the latter. One end of the driven member is provided with an axial recess 27 for receiving shaft 22 and coil spring 24. Shaft 22 is connected to anvil 25 by a pin 28 so that shaft 22 rotates with the driven member.

Anvil 25 has an axial opening 29 extending therethrough, which opening is coextensive with axial openings 30 and 31 in shaft 22 and the rotor of air motor 16, respectively. A feeler rod 32 is disposed for axial movement in registered openings 29, 30, and 31.

A disc or cap 33 is press-fitted on a part of the end wall of motor 16 and serves as a guide for the rear end portion of feeler rod 32. A lever 34 is pivotally mounted intermediate its ends adjacent the rear end portion of feeler rod 32. A pair of Belleville springs 35 is secured adjacent one end of lever 34 by a cap screw 36 which extends through the Belleville springs and is threadably connected to lever 34. A knob 37 is keyed to cap screw 36. To secure the knob in a selected position, juxtaposed serrations are provided on the adjacent surfaces of the knob and the tool housing at 38. A screw 39 is threaded through the end of lever 34 opposite from Belleville springs 35 and adjacent a trip valve 40.

Trip valve 40 comprises a body member 42 disposed for slidable movement in a sleeve 43 which is secured in a bore 44 formed in the housing of the tool. Body member 42 extends through a port 45 into a chamber 46 and is provided with a head portion 47 which functions to control the flow of the fluid through port 45. Chamber 46 communicates with passage 15 to receive the pressurized fluid from the latter. Body member 42 is biased by a spring 48 in an open position whereby the pressure fluid is permitted to flow from chamber 46, through port 45, into a chamber 49, and thence to motor 16. The communicating bleed passages 50 and 51 are provided in body member 42 to conduct the pressure fluid from chamber 46 to chamber 49 and a chamber 52 formed within sleeve 43 by body member 42. The bleed passages function to balance the pressures acting on body member 42. A ball 53 is disposed within sleeve 43 to control the flow of the pressurized fluid through a port 54 in the end wall of the sleeve. Ball 53 is in contact with screw 39 carried by lever 34 so that the movement of the lever toward the trip valve will cause screw 39 to unseat ball 53 and release the pressurized fluid from chamber 52 to the atmosphere through port 54 and an exhaust passage 55.

In the operation of the trip valve, the pressurized fluid is conducted to motor 16 through passage 15, chamber 46, port 45, chamber 49, and motor inlet ports 56 for the operation of motor 16. When feeler rod 32 is moved axially rearwardly against the force of Belleville springs 35 by the action of torque control mechanism 10, lever 34 is pivoted to force screw 39 against ball 53 to unseat the latter. When ball 53 is unseated, the pressurized fluid in chamber 52 is released to the atmosphere via port 54 and passage 55. This release of the pressure from chamber 52 creates a differential pressure across body member 42, which pressure forces the latter to move to the right, as viewed in FIG. 1, and head portion 47 to seat against the peripheral surface defining port 45 to thus close port 45. With port 45 closed, the pressurized fluid is prevented from reaching motor 16; and the latter, therefore, ceases to operate.

To provide for the cessation of the operation of motor 16 upon a predetermined torque load on the fastener engaging member (not shown), impact tool 11 is provided with torque control mechanism 10 of this invention.

Figure 6:
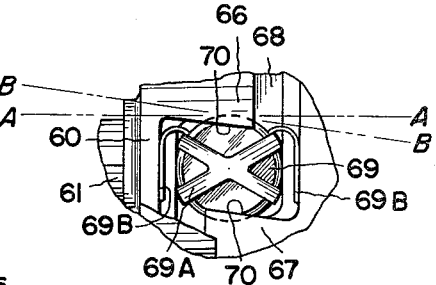
FIG. 6 is a fragmentary view, in elevation, of the torque control mechanism with parts broken away for purposes of illustration.

Torque control mechanism 10 comprises a torque transmitter 60 which has an axially, forwardly extending shank portion 61 for engaging a fastener engaging member (not shown), such as a socket, and an axially, rearwardly extending shank portion 62. Shank portion 62 is slidably receivable in an axial recess 63 in the forward end of the driven member or anvil 25, the recess being partially lined by a bushing 64. The end of shank portion 62 and the bottom of recess 63 define a cavity or chamber 65 in which is disposed an incompressible means, such as a rubber disc 59. Axial opening 29 in anvil 25 has an enlarged diameter portion 29A which communicates with cavity 65. As best shown in FIGS. 2, 3, and 6, torque transmitter 60 is provided with a pair of rearwardly extending jaws 66, while anvil 25 is provided with a pair of forwardly extending jaws 67 which are in rotative alignment with jaws 66 of torque transmitter 60, but circumferentially spaced from the adjacent jaws 66 to thereby provide a pair of spaces 68. A roller 69 is disposed in each space 68 so as to engage one jaw 66 and the adjacent jaw 67. Each of the rollers 69 is held in spaces 68 by the arcuate configuration of the roller engaging surfaces 70 of jaws 66 and 67 and the flats 71 formed in the torque transmitter and the anvil adjacent the inner surfaces of rollers 69 (see FIG. 3). In assembly the jaws 66 and 67 are brought into engagement with diametrically opposite portions of the rollers 69 by shims 79. Each of the rollers is supported in spaced relation to anvil 25 and torque transmitter 60 by a spring clip 69A to thereby insure pure rolling action of roller 69 with respect to roller engaging surfaces 70. Spring fingers 69B are relatively weak and, therefore, offer a negligible resistance to the axial movement of torque transmitter 60 with respect to anvil 25. Rollers 69 function to transmit the rotation of anvil 25 to torque transmitter 60. Rollers 69 are also dimensioned so as to permit limited, relative, axial movement of torque transmitter 60 and anvil 25.

As shown, torque transmitter 60 is biased in a forward or open position by a spring 72 which surrounds anvil 25 and abuts at one end against torque transmitter 60 and at the opposite end against an adjusting nut 73. Nut 73 meshes with the threads 74 provided on anvil 25 so that, by the rotation of nut 73, the force exerted by spring 72 against torque transmitter 60 may be controlled.

To provide for the axial movement of torque transmitter 60 relative to anvil 25 against the force exerted by spring 72, the juxtaposed roller engaging surfaces 70 of jaws 66 and 67 are inclined or pitched with respect to a line A—A extending parallel to the longitudinal axes of the torque transmitter and the anvil. The pitched or inclined surfaces 70 cooperate with each of the rollers to resolve a torque force into an axial component directed rearwardly, which force component, when it is of a sufficient magnitude to overcome the resistance or force of spring 72, causes the torque transmitter to move axially relative to anvil 25. The axial movement of the torque transmitter exerts a force on rubber disc 59 directly proportional to the torque load on the torque transmitter and causes the rubber disc to flow or deform into enlarged diameter portion 29A. Such flow or deformation forces feeler rod 32 to move axially rearwardly.

The torque transmitter is held in the above-described relationship with anvil 25 by tubular retainer 75 which is internally threaded at 76 to secure the tubular retainer to threads 74 on anvil 25. The distal end of tubular retainer 75 is internally threaded to receive retaining member 80.

Figure 5:
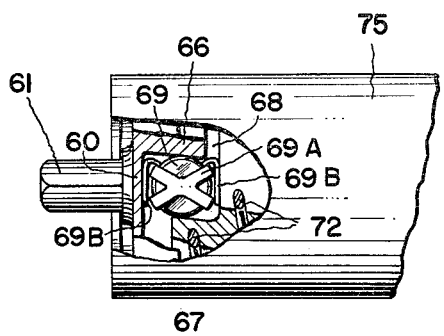
FIG. 5 is a view, similar to FIG. 2, showing the torque control mechanism in the same operative position as illustrated in FIG. 4.

In the operation of torque control mechanism 10, the rotation of anvil 25 is transmitted through rollers 69 to torque transmitter 60. When a predetermined torque load is imposed on torque transmitter 60, anvil 25 tends to rotatively override torque transmitter 60. This torque force is resolved into a force component directed rearwardly by the camming action of rollers 69 and roller engaging surfaces 70 of jaws 66 and 67 of torque transmitter 60 and anvil 25, respectively, to thereby force torque transmitter 60 to move axially rearwardly relative to anvil 25. The axial movement of torque transmitter 60 relative to anvil 25 exerts a force on rubber disc 59 through shank portion 62 of the torque transmitter. As best shown in FIGS. 4 and 5, this force causes disc 59 to deform or flow into enlarged diameter portion 29A of axial opening 29 in anvil 25 and into engagement with feeler rod 32 to cause the latter to move axially rearwardly. Since the pressure surface of shank portion 62 is substantially larger than the area of portion 29A, the amount of the axial movement of the torque transmitter is amplified so that a small movement of torque transmitter 60 is manifested in a relatively greater axial movement of feeler rod 32. This feature permits the adjustment of torque control mechanism 10 for fine increments of torque load values.

The axial movement of feeler rod 32 effects pivotal movement of lever 34, which pivotal movement unseats ball 53 thereby allowing the pressurized fluid in chamber 52 to escape to the atmosphere via port 54 and passage 55. With the release of the pressure fluid in chamber 52, an imbalance of pressure acting on body member 42 occurs and body member 42 is forced to move axially so as to close port 45. With port 45 closed, the pressurized fluid flow to motor 16 is stopped and motor 16 ceases to operate.

When motor 16 ceases to operate, spring 72 of the torque control mechanism returns torque transmitter 60 to the open position shown in FIGS. 1 and 2. Upon the return of torque transmitter 60 to its normal operative position, the pressure on rubber disc 59 is relieved and Belleville springs 35 return lever 34 and feeler rod 32 to their normal operative positions.

Since rollers 69 are in rolling engagement with surfaces 70 of jaws 66 and 67 along a line, as distinguished from a sliding surface-to-surface contact, the frictional forces between torque transmitter 60 and anvil 25 are greatly minimized so that torque control mechanism 10 senses and responds more directly to the actual torque load imposed on the torque transmitter. This feature permits torque transmitter 10 to be adjusted to more accurately apply a predetermined torque to a fastener (not shown) than prior-known torque control mechanisms.

In FIGS. 7 to 11 is a torque control mechanism 82 according to another embodiment of this invention. Torque control mechanism 82 differs from torque control mechanism 10 in that the roller means for interconnecting the driven member and the torque transmitter is mounted on a shaft and coacts with the camming surfaces formed by slots in the torque transmitter to effect the axial movement of the torque transmitter.

Figure 7:
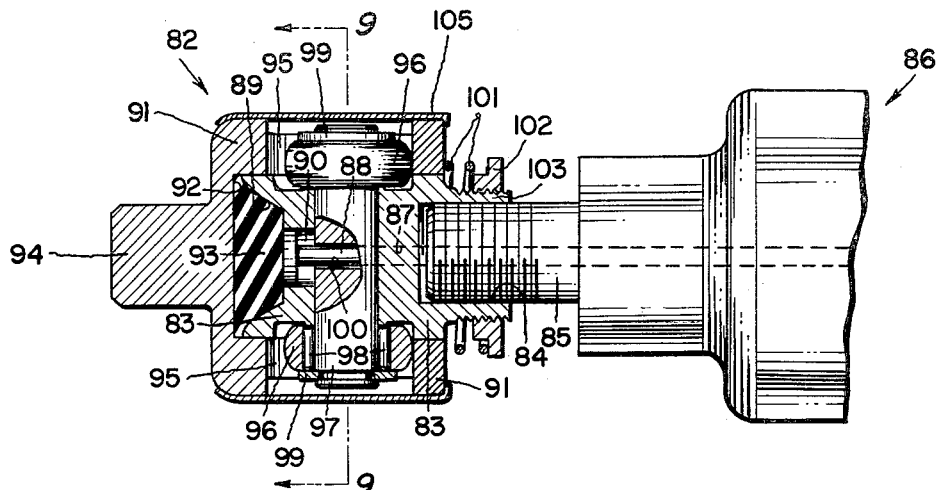
FIG. 7 is a fragmentary view, partly in cross section, of a torque control mechanism according to another embodiment of this invention.
Figures 8, 9:
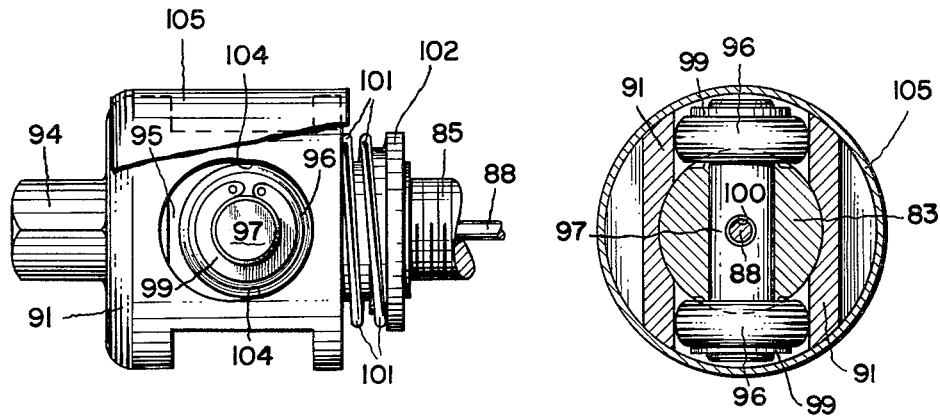
FIG. 8 is a fragmentary view of the torque control mechanism of FIG. 7 with part of the dust cover broken away for illustrative purposes.
FIG. 9 is a cross-sectional view taken along line 9—9 of FIG. 7.

As shown in FIGS. 7, 8, and 9, torque control mechanism 82 comprises a driven member 83 which is suitably connected to a rotatable output member or anvil 85 as by a tapped axial recess 84 adapted to receive a threaded end portion of anvil 85. Impact tool 86, including anvil 85, may be of the same construction as that of impact tool 11 shown in FIG. 1. Similar to anvil 25 of the embodiment shown in FIGS. 1 to 6, driven member 83 has an axial bore 87 in which a feeler rod 88, similar to feeler rod 32, is disposed for axial movement to actuate a motor control device such as shown in FIG. 1. Driven member 83 has a frusto-conical depression 89 in the forward distal end portion thereof which communicates with a smaller dimensioned bore 90, similar to enlarged diameter portion 29A of FIG. 1.

A torque transmitter 91 having an axial recess adapted to slidably receive driven member 83 is disposed on driven member 83 so that the end wall 92 of the torque transmitter defines with depression 89 a cavity in which is disposed an incompressible means, such as a rubber disc 93. The torque transmitter has a polygonal shank portion 94 which is adapted to receive a fastener engaging member, such as a socket (not shown). A pair of diametrically opposed slots 95 is provided in the torque transmitter. Each slot 95 in dimensioned to receive a roller 96 which is secured on a shaft 97 mounted on driven member 83. Shaft 97 is fixed while rollers 96 are supported for rotation on the shaft by bearings 98. A snap ring 99 is employed to secure each roller 96 on shaft 97.

An opening 100, coextensive with bore 87 and communicating with bore 90, is provided in shaft 97 to permit feeler rod 88 to extend therethrough. Torque transmitter 91 is biased in a forward direction relative to driven member 83 by a spring 101 which bears at one end against the torque transmitter and at the opposite end against an adjusting nut 102, adjusting nut 102 being threadably mounted on an externally threaded portion 103 of driven member 83.

Figure 10:
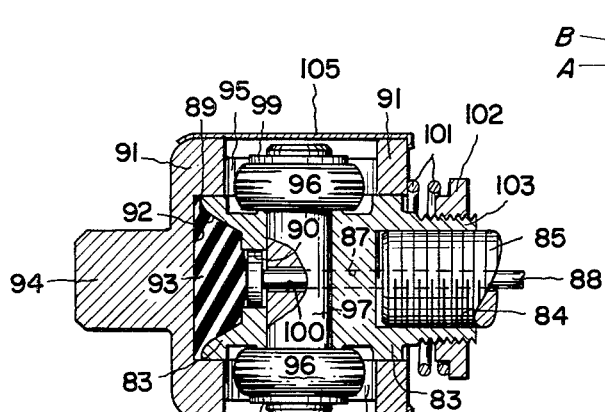
FIG. 10 is a cross-sectional, fragmentary view, similiar to FIG. 7, showing another operative position of the torque control mechanism.
Figure 11:
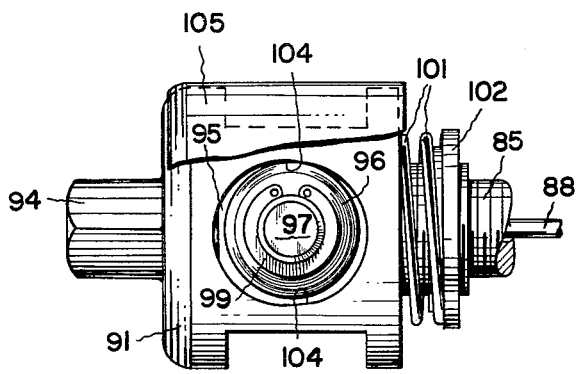
FIG. 11 is a view, similar to FIG. 8, showing another operative position of the torque control mechanism of FIG. 8.

As best shown in FIGS. 8 and 11, each of the slots 95 is tapered in a rearward direction so as to provide roller engaging surfaces 104 which, in cooperation with rollers 96, resolve the torque load imposed on torque transmitter 91 into a rearwardly directed force component. As best shown in FIGS. 10 and 11, when this axial force component reaches a magnitude greater than that of spring 101, torque transmitter 91 is forced axially rearwardly relative to driven member 83. The axial movement of torque transmitter 91 exerts a pressure on rubber disc 93, which pressure causes the latter to deform or flow into bore 90 and against feeler rod 88, thus forcing the latter to move axially. Since feeler rod 88 is connected in a suitable manner to cease the rotation of anvil 85, such as shown and described with respect to torque control mechanism 10, the axial movement of the feeler rod effects the cessation of the rotation of anvil 25 and driven member 83. Upon the cessation of the rotation of anvil 25 and driven member 83, spring 101 forces torque transmitter 91 axially forwardly, relative to the driven member, to the position shown in FIGS. 7 and 8.

As shown, a dust cover and guard 105 may be suitably secured to torque transmitter 91.

The frictional forces resisting the axial movement of torque transmitter 91 are minimized by the rolling line contact which is provided between rollers 96 and engaging surfaces 104, thus providing a torque control device which is capable of being more accurately adjusted to respond to a selected torque load.

It is believed now readily apparent that the present invention provides a novel torque control mechanism which can more accurately measure and respond to predetermined torque loads.

Although two embodiments of the invention have been illustrated and described in detail, it is to be expressly understood that the invention is not limited thereto. Various changes can be made in the arrangement of parts without departing from the spirit and scope of the invention as the same will now be understood by those skilled in the art.

I claim:
1. A torque control mechanism for a power tool comprising
 (a) a driven member connected to be rotatively driven by a source of rotary power,
 (b) a torque transmitter rotatably mounted adjacent said driven member for axial movement relative to the driven member,
 (c) said torque transmitter being adapted to engage a workpiece to be rotated,
 (d) said torque transmitter having a plurality of circumferentially spaced jaws,
 (e) said driven member having a plurality of circumferentially spaced jaws disposed in rotative alignment with and spaced from the jaws of said torque transmitter,
 (f) a rolling means disposed in each of the spaces between the next adjacent jaws of the driven member and the torque transmitter to provide conjoined rotation of the driven member and the torque transmitter,
 (g) the walls of said jaws engaging diametrically opposite portions of said rolling means being inclined so that, upon a predetermined torque load on said torque transmitter, the latter is forced to move axially relative to the driven member,
 (h) said driven member including a cavity adjacent said torque transmitter receiving therein a portion of said torque transmitter, (i) a substantially incompressible means capable of flowing when subjected to an external force disposed in said cavity to be subjected to the pressure by said torque transmitter upon the axial movement of said torque transmitter, (j) said driven member including a bore communicating with said cavity adjacent the side thereof opposite from said torque transmitter, and (k) rod means within said bore for axial movement therein extending adjacent the communication of said bore and said cavity for engagement with said incompressible means when the latter is caused to flow, (l) said rod means being operatively connected to said source of rotary power to effect the cessation of the rotation of the driven member when urged to move axially by said incompressible means upon a predetermined torque load on the torque transmitter.

2. A torque control mechanism for a power tool comprising (a) a torque transmitter mounted for rotary movement, (b) a driven member coaxially disposed within said torque transmitter operatively connected to a source of rotary power to be rotated thereby and axially movable relative to said torque transmitter, (c) said driven member including an axial recess closed by a portion of said torque transmitter, (d) a substantially incompressible means capable of flow when subjected to an external force disposed in said recess to be engaged by said portion of the torque transmitter, (e) said driven member including an opening communicating with said recess opposite from said portion of said torque transmitter, (f) an axially movable rod means in said opening with the end thereof disposed to be engaged by said incompressible means when the latter is caused to flow, (g) said rod means being operatively connected to said source of rotary power to effect the cessation of the rotation of the driven member upon axial movement of the rod means, (h) a pair of slots in said torque transmitter adjacent said driven member, and (i) a roller carried by the driven member within each of said slots to transmit the rotation of the driven member to the torque transmitter, (j) each of said slots including inclined roller engaging surfaces which force the rollers to move axially upon a predetermined torque load on the torque transmitter to thereby move the latter axially and exert a force on said incompressible means so that the latter flows and axially moves the rod means which, in turn, effects the cessation of the rotation of the driven member.

3. A torque control mechanism for a power tool, comprising:

(a) a driven member connected to a source of rotary power for rotation thereby, (b) a rotatable output member adjacent one end of said driven member and axially spaced therefrom to define an axial cavity intermediate said driven member and said output member, (c) one of said driven member and said output member being axially movable relative to the other thereof, (d) a substantially incompressible means capable of flow when subjected to external pressure disposed within said axial cavity between said driven member and said output member to be subjected to pressure upon the axial movement of said axially movable one of said driven and said output member, (e) said output member including a bore in communication with said axial cavity, (f) an extension rod slidably disposed within said bore extending adjacent said axial cavity to be displaced by said incompressible means upon the flow thereof, (g) said extension rod being operatively connected to said source of rotary power to stop the rotation of said driven member upon the displacement of said extension rod by said incompressible means, (h) said output member including at least one slot therein receiving the forward end of said driven member, and (i) a roller disposed in said slot with diametrically opposite portions in engagement with a wall of said output member and a wall of said driven member for transmitting rotation from said driven member to said output member, (j) said walls of said output member and said driven member engaging said rollers being pitched to allow movement of the axially movable one of said output member and said driven member towards said incompressible means when said driven member is driven at a predetermined torque by said source of rotary power.

4. A torque control mechanism for a power tool, comprising:

(a) a driven member connected to a source of rotary power for rotation thereby, (b) an output member adjacent one end of said driven member for axial and rotary movement relative to said driven member, (c) said driven member and said output member being axially spaced to provide an enclosed axial cavity therebetween, (d) a substantially incompressible means capable of flow when subjected to external pressure disposed within said cavity to be subjected to pressure by said output member upon axial movement thereof towards said driven member, (e) said output member including a bore in communication with said cavity, (f) an extension rod slidably disposed within said bore extending longitudinally adjacent said cavity to be longitudinally displaced upon the flow of said incompressible means, (g) said extension rod being operatively connected to said source of rotary power to stop the rotation of said driven member upon said displacement of said extension rod by said incompressible means, (h) said output member including a plurality of slots circumferentially of said driven member receiving said driven member, (i) a roller disposed in each of said slots with diametrically opposite portions in engagement with a wall of said output member and an adjacent wall of said driven member for transmitting rotation from said driven member to said output member, (j) said walls of said driven member and said output member engaging said rollers being pitched to allow axial movement of said output member against said incompressible means when said driven member is driven at a predetermined torque by said source of rotary power.

5. The apparatus of claim 4 wherein said output member extends longitudinally forward of said driven member, and said pitched walls of said output member and said driven member incline rearwardly inward.

References Cited by the Examiner

UNITED STATES PATENTS

| | | | |
|---|---|---|---|
| 2,844,044 | 7/1958 | Cole | 74—424.8 |
| 2,966,077 | 12/1960 | Wise | 74—424.8 |
| 3,166,170 | 1/1965 | Forster et al. | 192—56 |
| 3,174,606 | 3/1965 | Hornshuch et al. | 192—150 |

DAVID J. WILLIAMOWSKY, *Primary Examiner.*